United States Patent [19]

Barnes

[11] 3,760,412

[45] Sept. 18, 1973

[54] RATE ADAPTIVE NONSYNCHRONOUS DEMODULATOR APPARATUS

[76] Inventor: Roland O. Barnes, 834 S. 296th Pl., Federal Way, Wash. 98002

[22] Filed: July 1, 1971

[21] Appl. No.: 158,799

[52] U.S. Cl....... 340/347 DD, 329/104, 340/146.3 Z

[51] Int. Cl. .................................................. G06f 5/00

[58] Field of Search ..................... 340/347 DD, 171, 340/146.3 Z; 325/320, 321, 30; 178/66–68, 88; 329/104; 235/61.11 E

[56] References Cited

UNITED STATES PATENTS

| | | | |
|---|---|---|---|
| 3,701,097 | 10/1972 | Wolff | 235/61.11 E |
| 3,611,298 | 10/1971 | Jacobson | 325/320 |
| 3,121,197 | 2/1964 | Irland | 325/30 |
| 3,179,748 | 4/1965 | Farrow | 178/66 X |
| 3,230,457 | 1/1966 | Soffel | 178/66 X |
| 3,470,478 | 9/1969 | Crafts | 325/320 |
| 3,543,172 | 11/1970 | Seppeler | 329/104 |
| 3,571,712 | 3/1971 | Hellwarth et al. | 325/320 |
| 3,590,381 | 6/1971 | Ragsdale | 329/104 |
| 3,623,075 | 11/1971 | Bench | 340/347 DD |
| 3,656,064 | 4/1972 | Giles et al. | 329/104 |

*Primary Examiner*—Charles D. Miller
*Attorney*—Buckhorn et al.

[57] ABSTRACT

A nonsynchronous binary demodulator apparatus is described in which a series pulse duration modulated binary input signal of varying pulse rate is demodulated to form series binary output signals of nonreturn to zero type and shift output pulses synchronized to the bits of such output signals which are suitable for application of binary data into the shift register of a computer. A dynamic reference technique is employed to compensate for the varying pulse rate of the input signal in which the width of an input pulse and the width of the space between successive input pulses are compared by a comparator counter with a time reference signal derived from the immediately preceeding input pulse by a timing reference counter. The zero bit and one bit binary input pulses have widths of one and two time units, respectively, while the time reference signal has an effective width of one and a half time units. Such reference signal is derived from both zero bit and one bit pulses by adjusting the counting rate of the comparator counter with a compensation gate that changes the frequency of the clock pulses applied to such counter according to the last output bit stored in a memory circuit. In one embodiment employing 16 stage binary counters, the demodulator operated over a nonsynchronous pulse rate range of 2.5 to 5,000 pulses per second.

18 Claims, 2 Drawing Figures

ROLAND O. BARNES
INVENTOR

BY BUCKHORN, BLORE, KLARQUIST & SPARKMAN
ATTORNEYS

ROLAND O. BARNES
*INVENTOR*

*BY*

*BUCKHORN, BLORE, KLARQUIST & SPARKMAN*
*ATTORNEYS*

RATE ADAPTIVE NONSYNCHRONOUS DEMODULATOR APPARATUS

BACKGROUND OF THE INVENTION

The subject matter of the present invention relates generally to the demodulation of nonsynchronous digital signals, and in particular to a rate adaptive demodulator apparatus for binary input pulses employing a dynamic reference technique in which the width of each information pulse and the width of the spaces between successive input pulses are compared with that of a time reference signal derived from the immediately preceeding input pulse. As a result, the reference signal is corrected for each input pulse and timing errors do not accumulate with changes in pulse repetition rate.

The present demodulator is especially useful for processing nonsynchronous binary signals of pulse duration modulation type such as that produced by the hand operated reader of U.S. Pat. No. 3,359,405 of Gunnar A. Sundblad. However, the present invention does not require the critical size relationship between the reader aperture and the indicia line width which is necessary in the apparatus of the Sundblad patent. Since the photoelectric reader is hand operated, the widths of the binary pulses vary with the speed of movement of the operator's hand as well as with the path of movement. As a result, a nonsynchronous binary signal of varying pulse repetition rate is produced which is not suitable for transmission to the shift register of an electronic computer or other data processing device.

Previous nonsynchronous binary signal transmission apparatus use signals of three levels as indicated in the article by Mine, Haegawa and Koga, entitled "Asynchronous Transmission Schemes for Digital Information," *IEEE Transactions of Communication Technology*, Vol. Com-18, No. 5, Oct. 1970. The demodulator apparatus of the present invention enables the transmission of nonsynchronous binary signals of only two levels using the dynamic time reference technique. Thus, the binary input signal includes zero bit and one bit pulses of the same amplitude and polarity but of different widths of one and two time units, respectively. This elimination of one amplitude level in the binary signal greatly simplifies the signal transmission apparatus.

Another advantage of the present invention is that any input transducer device can be employed in the reader and such reader can be positioned remote from the demodulator. Also, since the pulse repetition rate of the input signal can vary, a hand operated reader whose scanning speed and scanning path varies, can be employed instead of prior art apparatus having a constant speed scanning motor and a straight edge reader guide. In addition, the present invention does not require the use of dual information channels or three level signals such as are produced by the tri-colored marks of other prior art apparatus.

The digital input signal transmitted to the demodulator circuit of the present invention includes a preamble pulse and a postamble pulse at the start and end, respectively, of each group of information pulses forming a "character" or "word" of bits. This preamble pulse has a width equal to one time unit and provides a time reference signal for comparison with the width of the first information pulse. When the zero and one bits of the binary information pulses are respectively one and two time units wide, then the reference signal is one and a half time units wide. Because of this large difference in zero and one bit widths and the dynamic reference technique for updating the reference signal for each input pulse, pulse repetition rate changes over an extremely wide range have no effect on the accuracy of the demodulator. For example, in one embodiment employing 16 stage binary counters, the pulse repetition rate can vary over a range of 2.5 to 5,000 bits per second and the change in pulse width between adjacent pulses can be as great as 25 percent for pulsewidening and 18 percent for pulse shortening.

The end of a word or character group is indicated by a long space equal to three time units in order to distinguish between the space between adjacent pulses within the word group. As a result, an extremely simple, efficient and accurate method for transmitting digital information is achieved using the demodulator of the present invention.

It is, therefore, one object of the present invention to provide a demodulator apparatus for nonsynchronous demodulation of series binary two level input signals of varying pulse repetition rates in a simple, efficient and accurate manner.

Another object of the invention is to provide such a demodulator in which the width of each of the input information pulses and the width of the spaces between successive input pulses are compared with a timing reference signal derived from the next preceeding input pulse.

Still another object is to provide such a demodulator in which compensated clock pulses are fed to a comparator counter at a frequency controlled by the last bit counted in order to maintain the same effective value for reference signals derived from input pulses of different widths.

A further object of the present invention is to provide such a demodulator in which a preamble pulse of predetermined width is provided at the start of each word or character group of input pulses to produce the time reference signal which is compared with the first information pulse in such group.

A still further object is to provide such a demodulator in which a terminal space is provided at the end of the group of input pulses which is longer than any of the information pulses or the spaces between such pulses in order to indicate the end of such group.

An additional object of the present invention is to provide such a demodulator for use in demodulating a series binary input signal of pulse duration modulation type in order to produce a series binary output signal of nonreturn to zero type which along with the usual synchronized shift pulses can be transmitted to the shift register of a digital computer or other data processing device in order to input the demodulated output signal into such shift register.

Another object of the present invention is to provide such a demodulator in which the input signal includes zero bit and one bit pulses of the same amplitude and polarity but of two different widths produced by scanning a record of binary indicia of two different widths by means of a hand operated reader.

BRIEF DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENT

Figure 1:
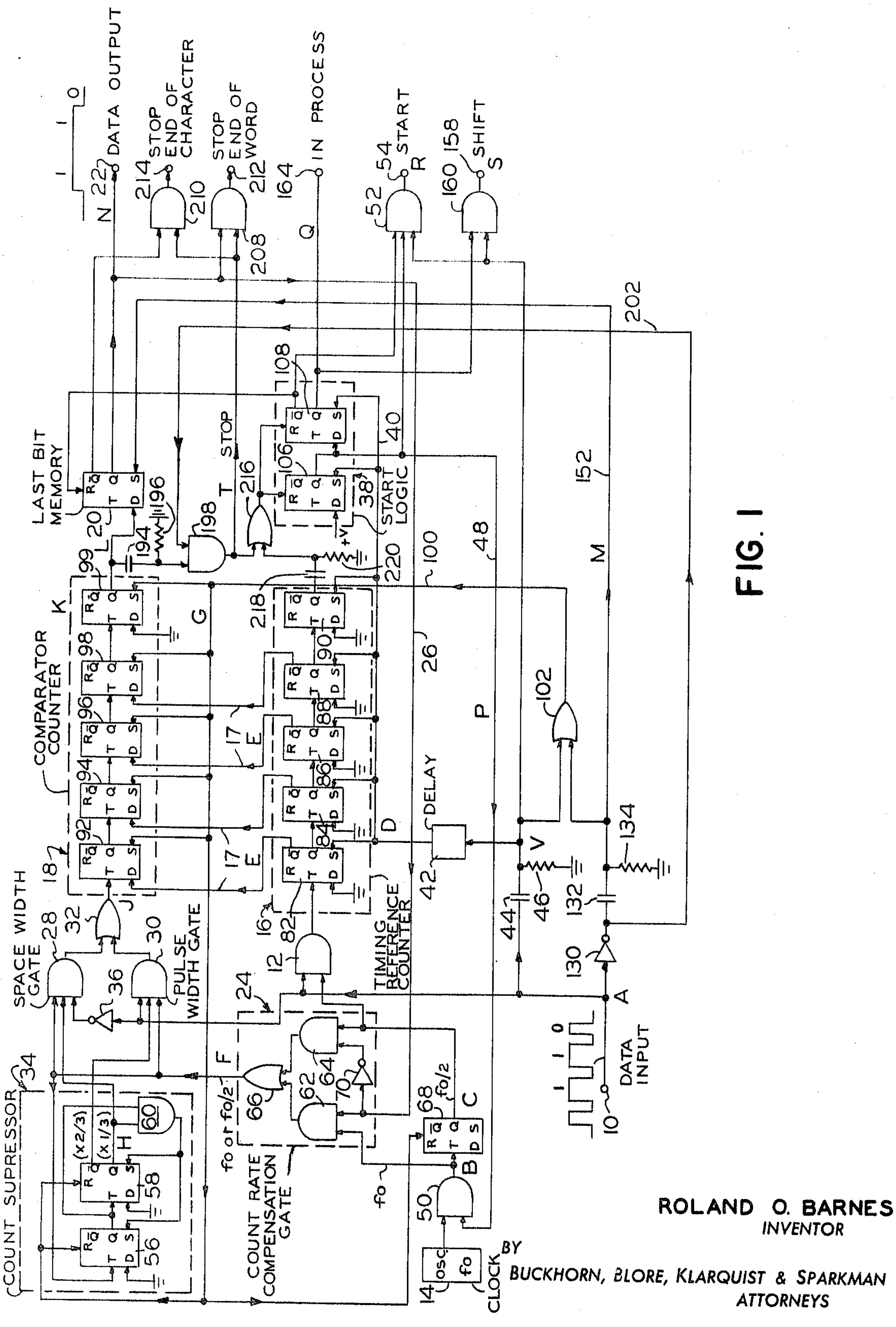
FIG. 1 is a schematic diagram of the electrical circuit of one embodiment of the demodulator apparatus of the present invention.

One embodiment of the nonsynchronous digital demodulator of the present invention which is suitable for demodulation of series binary input signals of pulse duration modulation type is shown in FIG. 1. The demodulator includes a data input terminal 10 to which the nonsynchronous series binary input signal is applied, such signal being a two level signal consisting of zero bit and one bit pulses of the same polarity and amplitude but of two different widths with the wide one bit pulse being at least twice the width of the narrow zero bit pulse. The pulse repetition rate of the input signal can vary such as when it is produced by a hand operated reader containing a photocell or other transducer which is scanned across a record of binary indicia that is in the form of bars or spaces of two different widths as shown in U.S. Pat. No. 3,359,405 of Sundblad mentioned previously.

The input pulses are transmitted from the data input terminal 10 to one input of a first And gate 12 whose other input is connected indirectly to a source 14 of clock pulses of predetermined frequency which may be a free running oscillator. The outut of gate 12 is connected to the input of a first digital counter 16 which acts as a timing reference counter. The timing reference counter 16 measures the width of each input signal pulse by counting the number of clock pulses occurring during such width and produces a width signal corresponding thereto at the "Q" outputs of the counter stages. The compliment of the width signal is a timing reference signal which is transferred in parallel from the "$\bar{Q}$" outputs of counter 16 through conductors 17 to the stages of a comparator counter 18. The comparator counter 18 compares the width of the next succeeding input pulse with this reference signal to determine whether it is wider or narrower than the reference signal and hereby classifies such input pulse as a zero bit or a one bit. The reference signal is provided with a relative value of one and one-half time units, while the zero bit pulse has a width of one time unit, and the one bit pulse has a width of two time units. The value of the reference signal is updated for each successive input pulse since it is derived from the width of the next previous input pulse. As a result, variations in the pulse repetition rate of the nonsynchronous input signal do not effect the accuracy of the demodulator.

The output of the comparator counter 18 is transmitted through a last bit memory circuit 20 to a data output terminal 22 as a demodulated digital output signal. This output signal is in the form of binary pulses coded differently than the input signal, such as a "non-return to zero" type of binary signal suitable for transmission to a serial shift register of a digital computer or other data processing apparatus. The output of the last bit memory 20 is also connected to a count rate compensation gate 24 through a conductor 26 to change the number of clock pulses which are applied to the comparator counter 18 during a given input pulse. Thus, the compensation gate 24 controls the count rate of such comparator counter in order to compensate for the fact that the reference voltage transferred from the reference counter 16 may be of two different values depending upon whether the preceeding input pulse was a narrow zero bit pulse or a wide one bit pulse. As a result of this compensation, the effective time reference signal is always set at one and one-half time units regardless of whether the reference signal is derived from a narrow input pulse or a wide input pulse.

The comparator counter 18 also measures the space between successive input pulses and generates a stop pulse signifying the end of a word group or character group of pulses when such space exceeds three time units. A space width gate 28 and a pulse width gate 30 are provided with their outputs connected through an Or gate 32 to the input of the comparator counter 18 in order to enable such counter to measure either the input pulse width or the space between input pulses. Both the space width gate 28 and the pulse width gate 30 are And gates having three imputs one of which is connected in common to the compensated clock pulses at the output of the compensation gate 24. Another input of each of gates 28 and 30 is connected to the "Q" and "$\bar{Q}$" outputs, respectively, of a count suppressor circuit 34. This count suppressor circuit suppresses every third clock pulse so that only two out of three compensated clock pulses are produced at "$\bar{Q}$" output, and suppresses every first and second clock pulse so that only one out of three clock pulses are produced at its "Q" output. The third input of the pulse width gate 30 is connected to the data input terminal 10 so that such gate is turned on only during input pulses, while the third input of the space width gate 28 is connected through an inverter 36 to such data input terminal so that this gate is only turned on during the spaces between input pulses.

A start logic circuit 38 is connected at its input through conductor 40, a delay circuit 42 and a differentiating network including a capacitor 44 and a resistor 46 to the data input terminal 10. The "Q" output of the first stage of such logic circuit is connected through a conductor 48 to a clock gate 50. The start logic circuit 38 is switched from its quiescent "zero, zero" state to a "one, zero" state in response to the receipt of the first input pulse and transmits a gating signal through conductor 48 to one input of the And gate 50 whose other input is connected to the clock oscillator 14. This enables clock pulses to be transmitted through gate 50 to the compensation gate 24 and the counter gate 12. The second data input pulse causes another And gate 52 to produce a start pulse at a start output terminal 54 at the output of such gate which indicates to the shift register of the computer connected to the data output terminal 22 that the data output signal is beginning. This is necessary because the first input pulse on input terminal 10 is a preamble pulse containing no information.

Each of the counters 16 and 18, the start logic circuit 38 and the count suppressor 34, is formed of a plurality of bistable multivibrators or flip-flop circuits formed as integrated circuit devices including the following six terminals:

| | |
|---|---|
| "T" | Triggering or Toggle Input which causes the device to switch to a one state when its "R" input is in a low state. |
| "Q" | True Output |
| "$\bar{Q}$" | False Output and the opposite of the "Q" output. |
| "R" | Reset Input which resets the flip-flop to zero |
| "D" | Presetable Data Input |
| "S" | Strobe input which causes the flip-flop state to follow the "D" input |

The count suppressor circuit 34 includes two of the flip-flop circuits 56 and 58 as well as an And gate 60 having two inputs connected to the "Q" outputs of such flip-flop circuits and having its output connected in common to the strobe inputs "S" of both of such flip-flop circuits. The trigger input "T" of the flip-flop circuit 56 is connected to the output of the compensation gate 24 to switch such flip-flop circuit upon receipt of compensated clock pulses. The And gate 60 provides negative feedback which immediately resets the flip-flop circuits 56 and 58 to a "zero, zero" state when their "Q" outputs both reach a "one, one" state. This causes the "Q̄" output of flip-flop 58 to be at a high voltage state two out of every three clock pulses and thereby causes the pulse width gate 30 to pass only two out of every three compensated clock pulses applied thereto from the output of the compensation gate 24. This means that during the data input pulses, the comparator counter 18 will count at only two-thirds the rate of the timing reference counter 16. Therefore, if a narrow zero bit input pulse of one time unit is applied to the reference counter 16, the reference signal derived therefrom and transferred to comparator counter 18 by parallel "Q̄" output lines 17 has an effective value of one and one-half time units because the comparator counter 18 counts at only two-thirds the rate of reference counter 16.

The count rate compensation gate 24 includes a pair of And gates 62 and 64 having their outputs connected to the inputs of an Or gate 66. Each of the two And gates 62 and 64 has a pair of inputs, one of which is connected to the oscillator source 14 of clock pulses and the other of which is connected by means of conductor 26 to the output of the last bit memory circuit 20. A frequency divider flip-flop 68 is connected between the output of the clock gate 50 and the common input of And gate 64 and counter gate 12 to apply thereto clock pulses having a frequency *fo*/2 of one-half the oscillator frequency. However, clock pulses having the frequency *fo* of the clock oscillator 14 are transmitted from the output of the clock gate 50 directly to the input of the And gate 62. An inverter circuit 70 is connected between conductor 26 and the second input of And gate 64. Thus, depending on which of the And gates 62 and 64 is enabled by the "Q" output of the last bit memory 20 through conductor 26, the compensated clock pulses produced at the output of Or gate 66 have a frequency equal to, or one-half that of the clock oscillator 14. The "Q" output of the last bit memory 20 is at a high voltage state when a one bit is stored in such memory which turns on And gate 62 and turns off And gate 64. As a result, the comparator counter 18 counts twice as fast due to the fact that the compensated clock pulses transmitted through gate 62 are of a frequency fo twice the frequency *fo*/2 of those previously transmitted through gate 64 because the last bit memory previously stored a zero bit corresponding to a preceeding preamble input pulse of narrow type.

Figure 2:
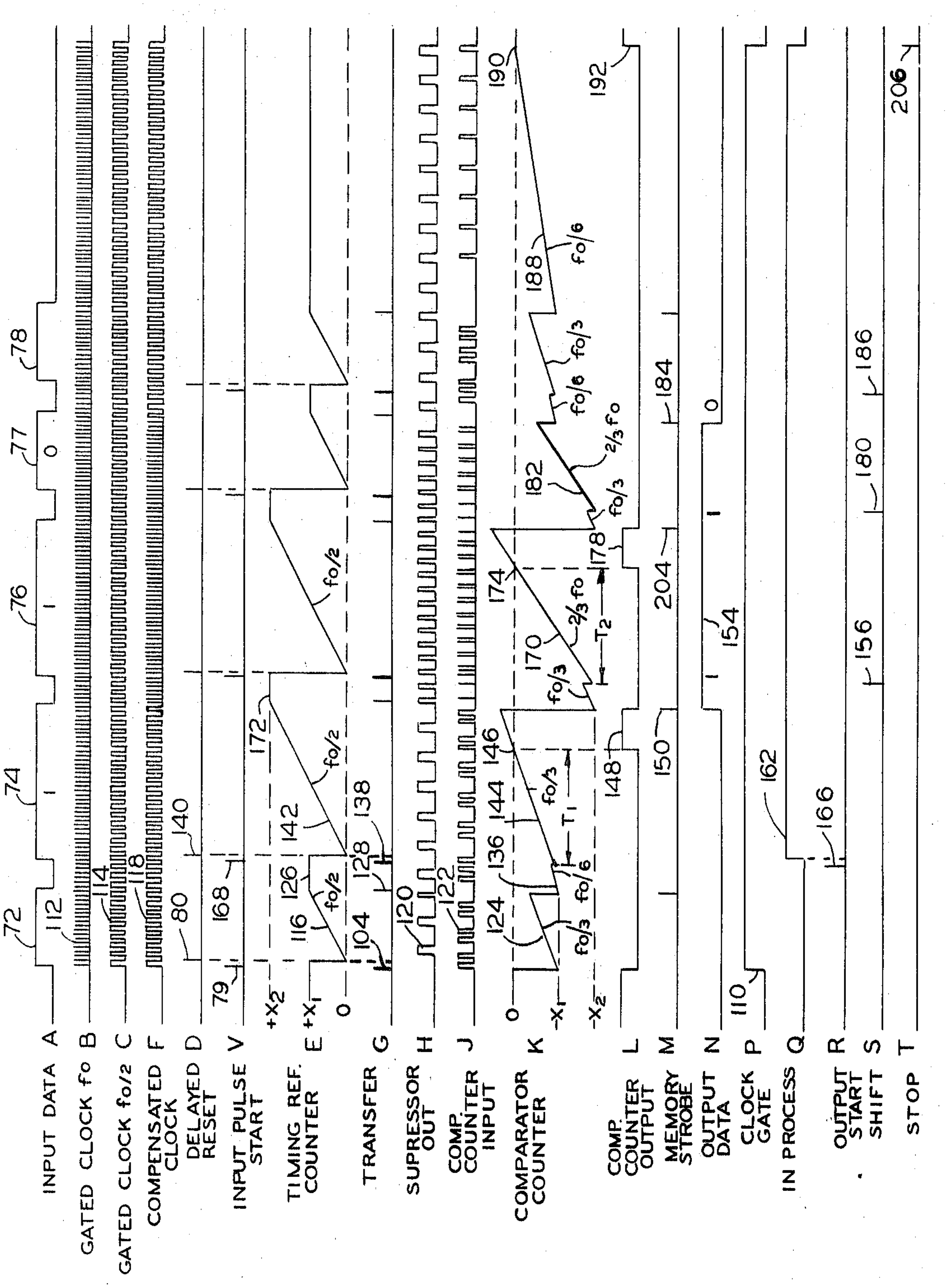
FIG. 2 is a waveform diagram of signals produced in the demodulator apparatus of FIG. 1.

The operation of the demodulator circuit of FIG. 1 is best understood by reference to the signal waveforms shown in FIG. 2 which are keyed by letters at their positions in the circuit of FIG. 1. The binary data input signal A includes a preamble pulse 72 of narrow type whose primary function is to provide a reference signal for comparison with the second input pulse 74 which is the first information pulse to determine whether it is a one bit or a zero bit pulse. In the example shown, the second input pulse 74 is a one bit pulse of wide type, the third input pulse 76 is also a one bit pulse while the fourth input pulse 77 is a zero bit pulse of narrow type. The last pulse 78 of the word group is a postamble pulse which, like the preamble pulse 72 may be of narrow type one time unit width and whose primary function is to signal the end of the word, as hereafter discussed. The positive going leading edge of the first input pulse 72 is transmitted from input terminal 10 through the differentiating network 44 and 46 as a start spike pulse 79 which is fed to the output of the delay circuit 42 as a delayed reset pulse 80. This delayed reset pulse 80 is applied to the strobe input of the five counter stages 82, 84, 86, 88 and 90 of the timing reference counter 16 to cause such counter stages to reset to zero because the data input terminal "D" of each of such stages is connected to ground. It should be noted that prior to this, any reference signal previously in counter 16 is transferred from its "Q̄" output by conductors 17 to the "D" inputs of the first four stages 92, 94, 96 and 98 of the comparator counter 18 while the last stage 99 has its "D" input grounded. The strobe inputs of stages 92, 94, 96 and 98 are connected through a common conductor 100 to the output of an Or gate 102 where a transfer pulse 104 is generated by the input pulse start spike 79. The delayed reset pulse 80 is also transmitted to the strobe inputs of two flip-flop circuits 106 and 108 forming the start logic circuit 38. The data input "D" of flip-flop circuit 106 is connected to a high voltage source so that it produces a one state output signal at its "Q" output upon receipt of such strobe pulse. This one state output is transmitted as a clock gate signal 110 along conductor 48 to the clock gate 50 rendering it conducting and causing it to transmit gated clock pulses 112 of frequency fo which are, in turn transmitted from frequency divider 68 as gated clock pulses 114 of frequency *fo*/2. The gated clock pulses 114 are transmitted through And gate 12 to the timing reference counter 16 which counts such clock pulses to produce a reference counter ramp signal 116 starting at a zero voltage level corresponding to the resetting of a counter by delayed reset pulse 80 and terminating at the end of the first input pulse 72.

The last bit memory 20 has its "Q" output in a low voltage zero bit state after being reset at the end of the previous "word" which is transmitted as a negative gating signal through conductor 26 to the compensation gate 24 so it renders And gate 62 nonconducting and, after transmission through inverter 70, renders And gate 64 conducting. As a result, the compensated clock pulses 118 produced at the output of Or gate 66 are of a frequency *fo*/2. These compensated clock pulses are fed to the input of the count suppressor 34 at the trigger input of flip-flop 56 and such count suppressor produces a suppressor output signal 120 of one-third frequency or *fo*/6 at the "Q" output of flip-flop 58 and applies it to the space width gate 28. A similar signal, but inverted, of two-thirds frequency or *fo*/3 is produced on the "Q̄" output of flip-flop 58 and transmitted to the pulse width gate 30. As a result, the input signal 122 applied to the comparator counter 18 by the pulse width gate 30 consists of two out of every three compensated clock pulses applied to the input of such gate, so that the comparator counter ramp signal 124 has a slope or count rate of *fo*/3.

At the end of the preamble input pulse 72, the timing reference counter 16 stops counting because And gate 12 is turned off and a reference voltage 126 of a value $+X_1$ proportioned to the width of such preamble input pulse is stored in such counter. The complement $-X_1$ of this reference voltage is transferred to the comparator counter 18 through conductors 17 when a transfer pulse 128 is produced at the output 100 of the Or gate 102 by the negative trailing edge of the preamble pulse 72 transmitted through an inverter 130 and a differentiating circuit including capacitor 132 and resistor 134. At the same time, the negative input signal produced during the space between the preamble pulse 72 and the one bit input pulse 74, is inverted by inverter circuit 36 to enable the space width gate 28 to transmit compensated clock pulses of frequency *fo*/6 to the comparator counter during such space. As a result, the comparator counter 18 produces another counter ramp signal 136 which starts at a reference voltage level $-X_1$ and terminates before it crosses the zero volt level so that no output pulse is produced at the "Q" output of the last stage 99 of such counter.

When the positive going leading edge of the second input pulse 74 is received and produces a third transfer pulse 138 at the output of Or gate 102, the complement $-X_1$ of the reference signal $+X_1$ stored in the timing reference counter 16 is again transferred from such reference counter to the comparator counter. A short time later, a delayed reset pulse 140 is applied to the strobe inputs of the timing reference counter to reset the timing counter signal to zero. Then another timing reference voltage ramp 142 begins with a slope or count rate of *fo*/2 and, in addition, another comparator counter ramp 144 begins with a slope of *fo*/3. This comparator counter ramp 144 crosses the zero level indicating that input pulse 74 is a one bit, because the duration of input pulse 74 is about two time units and is greater than the timing reference of one and one-half time units. At the crossing point 146, a positive going comparator counter output pulse 148 is produced at the "Q" output of the last stage 99 of the comparator counter 18 and is applied to the data input "D" of the last bit memory 20. A memory strobe pulse 150 is produced by the negative going trailing edge of the input pulse 74 transmitted through the inverter 130, the differentiating network 132 and 134, and conductor 152 to the strobe input of the last bit memory 20. This produces a one bit output pulse on the "Q" output of the last bit memory which is transmitted as a positive going binary output pulse 154 to the data output terminal 22. A short time later, a shift pulse 156 is produced at the output terminal 158 of an And gate 160 at a time corresponding to the positive going leading edge of the third input signal 76, since at that time, the start logic circuit 38 is still in a high output one state at the "Q" output of flip-flop 108. This shift pulse 156 causes the shift register connected to the data output terminal 22 to accept the data output signal 154. It should be noted that an "in process" signal 162 is transmitted from the "Q" output of the start logic flip-flop 108 to an output terminal 164 upon the receipt of the second delayed reset pulse 140 at the strobe inputs of the start logic flip-flops 106 and 108. Thus, the first reset pulse 80 strobes flip-flop 106 to a one state at its "Q" output due to the high voltage applied to its data input, while the "Q" output of flip-flop 108 remains in a zero state since its data input was zero at the time of such first reset pulse. However, on application of the second delayed reset pulse 140 to the strobe inputs of flip-flops 106 and 108, the "Q" output of flip-flop 106 and the "D" input of flip-flop 108 are at a one state so that the "Q" output of flip-flop 108 switches to a one state and produce the "in process" signal 162 at output terminal 164. This in process signal indicates that a data signal transmission is in process.

An output start pulse 166 is produced at the output terminal 54 of And gate 52 at the leading edge of the input pulse 74 to indicate the start of the information pulses 74, 76 and 77. It should be noted that the output start pulse is produced slightly before the in process signal 162 due to the time delay circuit 42 which delays switching of the start logic flip-flop 108. Thus, the "$\bar{Q}$" output of flip-flop 108 is still at a one state when the undelayed input pulse start spike 168 is transmitted through differentiating circuit 44 and 46 to the input of the And gate 52 to produce the output start pulse. At the same time, no shift pulse is produced because the "Q" output of the start logic flip-flop 108 is still at a zero level.

The same operation occurs for the third input pulse 76 except that the comparator counter ramp 170 corresponding thereto has a greater slope of 2/3 *fo* and is compared with a second reference voltage $-X_2$ twice that of the first reference voltage $-X_1$. This second reference voltage is the complement of the maximum voltage 172 reached by the timing reference counter ramp 142 during the previous input pulse 74. Thus, since the previous input pulse 74 is twice as wide as the preamble pulse 72 or zero bit pulse 77, it causes the counter ramp 142 to reach a maximum voltage 172, which is twice the maximum voltage 126 of counter ramp 116. As stated previously, a complement $-X_2$ of this maximum voltage is transferred from the "$\bar{Q}$" outputs of counter 16 to the data inputs of counter 18 and serves as the reference signal which is compared with the comparator counter ramp 170. As a result of the comparator counter ramp 170 having a greater slope of 2/3 *fo*, it crosses the zero reference level at point 174 at a time $T_2$ with respect to the start of such ramp which is equal to the time $T_1$ that it takes the comparator counter ramp 144 to reach crossing point 146 even though the reference voltage $-X_2$ is twice that of the previous reference voltage $-X_1$. This increase in slope of the comparator counter ramp 170 is due to the action of the compensation gate 24 which automatically increases the frequency of the compensated clock pulses 118 from *fo*/2 to *fo* due to the fact that the high voltage one state output of the last bit memory 20 is transmitted through conductor 26 to open And gate 62 and close And gate 64 at the start of the output data signal 154.

A second comparator counter output pulse 178 is produced at the output of the last stage 99 of the comparator 18 at the time of crossing point 174 and maintains the "Q" output of the last bit memory in a high voltage one state so that the output data signal 154 remains positive, thereby indicating another one bit in the output data signal at the time the second shift pulse 180 occurs. However, during the zero bit input pulse 77, a comparator counter ramp 182 is produced which does not cross the zero reference level and does not produce a comparator counter output pulse. As a result, the data input to the last bit memory 20 is zero when the memory strobe pulse 184 occurs which causes the "Q" output of such memory to go to a low voltage state and produce a zero bit in the output data signal 154 which is transferred to the shift register when the next shift pulse 186 is produced.

After the end of the postamble pulse 78, a long termination space occurs indicating the end of the data input signal. A comparator counter ramp 188 produced during such space reaches the zero voltage level at point 190 which causes the counter 18 to produce a counter output pulse 192. This positive going step pulse 192 is differentiated by capacitor 194 and resistor 196 and applied as a positive spike pulse to one input of And gate 198. The other input of And gate 198 is connected through a conductor 202 to the output of inverter 130 so that And gate 198 is enabled during the space between input pulses. The And gate 198 does not produce an output pulse at the times corresponding to memory strobe pulses 150 and 204 during the inter-pulse spaces even though the comparator counter output pulses 148 and 178 are produced then because such counter output pulses are differentiated by capacitor 194 and applied as positive and negative spikes to such And gate. Thus, the And gate 198 only produces a stop pulse 206 at its output at the crossing point 190. This stop pulse 206 is transmitted to the inputs of a pair of And gates 208 and 210 having their other inputs connected respectively to the "Q" output and the "$\bar{Q}$" output of the last bit memory 20. The outputs of gates 208 and 210 are respectively connected to an "end of word" output terminal 212 and an "end of character" output terminal 214. The end of character gate 210 is rendered conducting to transmit the stop pulse if the postamble input pulse 78 is the narrow one time unit type shown. The end of word gate 208 is rendered conducting to transmit such stop pulse only if such postamble pulse is of the wide, two time units type since its comparator counter ramp will cross the zero level and trigger the last bit memory to a one state at its "Q" output.

The output of the And gate 198 is also connected through an Or gate 216 to the reset inputs of the start logic flip-flops 106 and 108 to reset the start logic circuit 38 to a zero, zero state. This terminates the clock gate signal 110 turning off such And gate 50 and stopping all clock pulses 112, 114, and 118. At the same time, the in process signal 162 is terminated due to the resetting of flip-flop 108 to a zero state, and the last bit memory is also reset to a zero state if it was previously triggered by a wide type postamble pulse. This terminates one cycle of operation of the demodulator circuit of the present invention.

It should be noted that the Or gate 216 is also connected at its other input through a differentiating circuit including capacitor 218 and resistor 220 to the "Q" output of the last stage 90 of the timing reference counter 16. As a result, if for some reason such last stage 90 is triggered to a one level, it resets the start logic circuit 38 to prevent any further counting since then the corresponding reference signal would not be accurately related to the width of the input pulse then applied to the And gate 12.

It will be obvious to those having ordinary skill in the art that many changes may be made in the above-described preferred embodiment of the present invention without departing from the spirit of the invention. For example, other logic elements can be employed than the pure logic elements shown and a separate comparator counter stage may be used in addition to counter stage 18 for counting clock pulses transmitted during the spaces between pulses. Also different coded binary input signals can be employed, such as a biphase binary signal which indicates a one bit or a zero bit by a positive or negative sloped step signal. Therefore, the scope of the present invention should only be determined by the following claims.

I claim:

1. A nonsynchronous demodulator apparatus in which the improvement comprises:

input means for supplying to the input of the demodulator a series binary input signal of two level nonsynchronous binary bits having a nonuniform bit rate;

dynamic time reference means for determining the width of successive ones of said input bits, and for producing a dynamic time reference signal corresponding to the width of each input bit so that the value of said reference signal is automatically changed in response to changes in the width of said input bits due to variations in the bit rate; and comparator means for comparing the input bits with the reference signal corresponding to the next preceding input bit to determine whether the compared input bit is a binary one bit or a zero bit for producing a series binary output signal or output pulses corresponding to said input signal but of a different code;

said comparator means also comparing said reference signal with space width signals corresponding to the widths of the spaces between successive input bits and producing a stop pulse when a space width signal exceeds said reference signal thereby indicating the end of the input signal.

2. A demodulator apparatus in accordance with claim 1 in which the binary input bits are pulses of two different widths.

3. A demodulator apparatus in accordance with claim 1 which also includes a compensation means separate from said reference means to enable the reference signal produced by one bit type of binary input pulse to be compared with another bit type of input pulse as well as with said one type of binary input pulse.

4. A demodulator apparatus in accordance with claim 3 in which the comparator means includes a comparator counter for counting digital pulses having its input connected through the compensation means and a comparator gate means to the output of a clock pulse generator, said comparator gate means being rendered conducting by the input signal, and said compensation means changing the count rate of said comparator counter to compensate for the different width input pulses.

5. A demodulator in accordance with claim 4 in which the compensation means includes a memory means for storing the binary value according to the last bit output pulse and for operating the comparator gate means to increase the frequency of compensated clock pulses produced at the output of said compensation means which are applied to the comparator counter during an input pulse following a preceding input pulse of wide bit type and to decrease the frequency of said compensated clock pulses during an input pulse following a preceding input pulse of narrow bit type.

6. A demodulator apparatus in accordance with claim 1 in which the input bits include binary information bits arranged in groups, and preamble bits positioned at the beginning of each group.

7. A demodulator apparatus in accordance with claim 1 in which the timing reference means includes a first digital counter, a clock pulse generator and first gate means for applying clock pulses of predetermined frequency from said clock generator to the input of said first counter when said gate means is gated on by said input bits.

8. A demodulator apparatus in accordance with claim 7 which includes a transfer means for transferring the complement of the first counter output voltage in parallel from said first counter to a second counter in said comparator means to provide said reference signal for comparison with said input bits by said second counter.

9. A demodulator apparatus in accordance with claim 8 in which the second counter also operates as a space width comparator means for comparing said reference signal with a space width signal corresponding to the space between successive input pulses, and produces a stop pulse when said space width signal exceeds said reference signal indicating the end of said input signal.

10. A demodulator apparatus in accordance with claim 9 in which the space width comparator means also includes and a third gate means connected between the input of said second counter and the output of said compensation means, said third gate means being gated on to transmit compensated clock pulses only during the space between said input pulses.

11. A demodulator apparatus in accordance with claim 1 which also includes means for producing shift output pulses that are synchronized with the information bits of the output signal.

12. A nonsynchronous demodulator apparatus in which the improvement comprises:

input means for supplying to the input of the demodulator a nonsynchronous binary input signal of two levels that is comprised of a series of binary pulses having the same amplitude and polarity but two different widths corresponding to different bits with the width of the wider pulse being at least twice the width of the narrower pulse;

timing means for determining the widths of successive ones of said input pulses and for producing width signals corresponding to said pulse widths;

a first dynamic time reference means for producing a first time reference signal whose duration is proportional to said width signal obtained from the previous input pulse by a first predetermined proportionality factor and which begins coincident with the start of the succeeding input pulse;

a first comparator means for comparing the duration of said first time reference signal with the width of the next succeeding input pulse in order to classify said input pulse as to whether it is of the wide or the narrow type and for producing a series binary output signal in which demodulated binary data are represented by two different voltage states at the output;

a second dynamic time reference means for producing a second time reference signal whose duration is proportional to said width signal obtained from the previous input pulse by a second predetermined proportionality factor and which begins coincident with the start of the succeeding input space;

a second comparator means for comparing the duration of said second time reference signal with the duration of the space between said input pulses for determining when input pulses have ceased and then generating an output stop pulse, and for terminating said timing means and said first and second reference means in preparation for receiving the next series of input pulses; and a compensating means for causing said first and second time reference signals to have durations which are proportional to said width signals but are independent of which of the two types of input pulses produced said width signal.

13. A demodulating apparatus in accordance with claim 12 in which the timing means includes a first digital counter, a reset means to start said first counter counting up from zero, a clock pulse generator and a first gate means for applying clock pulses of a predetermined frequency from said clock generator to the input of said first counter when said first gate means is gated on during said input pulses so that at the end of said input pulses said first counter contains a width signal which is a digital number whose magnitude is proportional to the width of said input pulses.

14. A demodulating apparatus in accordance with claim 13 in which the first reference means includes a second digital counter, a transfer means by which the complement of said first value present in said first counter is preset into said second digital counter at the end of said input pulse, a second gate means for applying clock pulses from said clock generator to the input of said second counter when said second gate means is gated on during said input pulses, and a pulse suppression means for regularly eliminating a predetermined fraction of said clock pulses from the input of said second digital counter.

15. A demodulating apparatus in accordance with claim 14 in which the first comparator means includes a last bit memory means for storing the state of the last stage of said second digital counter at the instant that said input pulse end, said state being zero when said input pulse is of the narrow kind and said state being one when said input pulse is of the wider kind.

16. A demodulating apparatus in accordance with claim 15 in which the second reference means includes said second digital counter, a transfer means by which the complement of said width signal present in said first counter is preset into said third digital counter at the end of said input pulse, and a third gate means for applying clock pulses from said clock generator to the input of said second counter when said third gate means is gated on during the space between said input pulses.

17. A demodulating apparatus in accordance with claim 16 in which the compensating means includes a fourth gating means by which the second digital counter is caused to count when a wide type succeeding input pulse is compared with a first reference signal produced at double the rate by the width signal of a narrow type preceeding input pulse.

18. A demodulating apparatus in accordance with claim 16 in which the second comparator means includes said second counter whose last stage reaches the one state when the duration of the space between said input pulses exceeds a predetermined number of integral widths of said compensated timing reference signals for generating a stop signal at the demodulator output to denote the end of a group of said input signals.

* * * * *

UNITED STATES PATENT OFFICE
CERTIFICATE OF CORRECTION

Patent No. 3,760,412 Dated September 18, 1973

Inventor(s) ROLAND O. BARNES

It is certified that error appears in the above-identified patent and that said Letters Patent are hereby corrected as shown below:

In Column 2, line 10, "pulsewidening" should be --pulse widening--;

In Column 3, line 29, "outut" should be --output--;

In Column 3, line 43, "hereby" should be --thereby--;

In Column 4, line 18, "imputs" should be --inputs--;

In Column 11, line 25 (Claim 10, line 3) after "includes" delete --and--.

Signed and sealed this 25th day of December 1973.

(SEAL)
Attest:

EDWARD M.FLETCHER,JR.
Attesting Officer

RENE D. TEGTMEYER
Acting Commissioner of Patents